US006338068B1

(12) United States Patent
Moore et al.

(10) Patent No.: US 6,338,068 B1
(45) Date of Patent: Jan. 8, 2002

(54) METHOD TO DEMONSTRATE SOFTWARE THAT PERFORMS DATABASE QUERIES

(75) Inventors: Victor S. Moore, Boynton Beach; Glen R. Walters, Hollywood, both of FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/211,778

(22) Filed: Dec. 14, 1998

(51) Int. Cl.$^7$ .............................................. G06F 17/30
(52) U.S. Cl. ........................ 707/102; 707/103; 709/202
(58) Field of Search ................. 707/102, 103; 709/202

(56) References Cited

U.S. PATENT DOCUMENTS

| | | | | |
|---|---|---|---|---|
| 5,892,909 A | * | 4/1999 | Grasso et al. | 709/201 |
| 5,951,636 A | * | 9/1999 | Zerber | 709/202 |
| 6,119,133 A | * | 9/2000 | Nusbickel et al. | 707/205 |
| 6,119,229 A | * | 9/2000 | Martinez et al. | 713/200 |
| 6,131,121 A | * | 10/2000 | Mattaway et al. | 709/227 |
| 6,151,688 A | * | 11/2000 | Wipfel et al. | 714/48 |
| 6,263,313 B1 | * | 7/2001 | Milsted et al. | 705/1 |
| 6,263,362 B1 | * | 7/2001 | Donoho et al. | 709/207 |
| 6,263,491 B1 | * | 7/2001 | Hunt | 717/4 |

OTHER PUBLICATIONS

U.S. application No. 09/061,387 Extensible Method and Apparatus for Retrieving File Name During Program Execution, filing date Jan. 3 or, 1998.

* cited by examiner

*Primary Examiner*—Wayne Amsbury
(74) *Attorney, Agent, or Firm*—Fleit, Kain, Gibbons, Gutman & Bongini P.I; Jon A. Gibbons

(57) ABSTRACT

A method to retrieve data in a information processing unit. The method comprises: creating a pointer into a database based on a category for data to be retrieved, determining if an application running on the information processing unit is running in an online mode where the information processing unit is coupled to a database server or if the application is running in an offline mode where the information processing unit is not coupled to the database server; and retrieving at least part of the data using the pointer to the database when the application is running in an online mode. In accordance with another aspect of the invention, a computer readable medium can include instructions to program data processing apparatus to carry out the above method.

18 Claims, 5 Drawing Sheets

METHOD TO DEMONSTRATE SOFTWARE THAT PERFORMS DATABASE QUERIES

CROSS-REFERENCE TO RELATED APPLICATIONS

Not applicable

BACKGROUND OF THE INVENTION

1. Field of the Invention

The invention disclosed broadly relates to the field of computer software development and more particularly relates to the field of software toolkits for application development for applications performing database queries.

2. Description of the Related Art

The number of web-based software applications that use database queries continues to grow as more information becomes available through the Internet and the World Wide Web. One example of a Web based program using database queries is the online or electronic Yellow pages application that is described in the patent application Ser. No. 09/061,387, filed Jan. 30, 1998, for "Extensible Method And Apparatus For Retrieving File Names During Program Execution" by Joseph Celi, Jr. and Wendi L. Nusbickel, commonly assigned herewith to International Business Machines Corporation (IBM) now U.S. Pat. No. 6,119,133. The electronic Yellow Pages are Online or Web-based directory listings are the electronic or online analogues to their familiar, traditional paper counterparts Traditional paper telephone directory listings like the White Pages, Yellow Pages and industry specific directory listings have been around for decades. These online directory services are expanding beyond providing simply name, address and telephone information and have begun to offer E-Mail directory listings, Web page address listings, fax directory listings, maps of the business location, additional information in a multimedia format about the business listing and much more.

Computer applications such as online directory services use database retrieval techniques to present data to users. These classes of applications are often referred to as "data driven" because the exact display of the data on the computer screen is not known until runtime. Typically, these applications provide information in response to a user request by filling-in fixed data fields in a presentation screen with data retrieved from a database. In the online directory listing example data fields are filled-in with data stored in a database. The data includes residential name or business name, address and telephone number. Optional data fields such as zip code may also be included, and like their paper counterpart, online Yellow Page applications permit customized advertisement to be displayed with a directory listing. However, the online Yellow Page applications expand beyond these basic print advertisements to include multimedia advertisements that may relate to the listing. The customized multimedia advertisement may be related to the specific directory listing or a regional advertisement or an advertisement related to some other feature. One example of additional data that may be displayed in relation to a specific directory query is a street-map. An example street mapping example can be found at the online URL http://www.yahoo.com under the link "maps." A challenge for programmers and software designers is providing the correct regional map and related data, such as advertisement, for each user request. Software designers typically use relational databases to organize data such as images files of regional maps. The use of databases allows images of regional maps and other data to be indexed in an organized manner in order to be retrieved with a given user query. Database records comprising a series of database elements are designed to hold two fields, a first field designated to hold the names of image files, such as images of street maps, and a second field to hold the names of data files. The use of filenames for the image file or data file permits the database entries to remain unchanged and at the same time enables the updating of the contents of the files themselves This combination of a relational database with filename entries, enables fast, efficient retrieval of images and related data that may be stored locally or remotely via a network.

While the use of a data driven program via database servers is increasing, they are not without their shortcomings. Like most providers of software applications, providers of Web-based, Intranet, Internet, and client server type applications have a need to demonstrate their software programs to prospective customers and users. However, demonstrating software products that depend on databases running on a server can be a problem. In order to demonstrate querying to a database, the application must be actively connected to the database. Many times this can be inconvenient, especially for demonstrations on the road where a sales person is using a laptop PC to demonstrate the software product. Some sales persons use a local copy of a database running on a client PC, however, the size of larger databases can make this impractical for many applications because the database can not physically fit on the disk space in a laptop PC. Accordingly, a need exists to enables providers of data driven applications performing database queries a method to demonstrate an application without being connected to a database.

Today, many data driven programs that use database information are written in a programming language known as Java. Java is a programming language developed by Sun Microsystems. A basic idea behind Java programming is that the same Java software code can run on many different kinds of computers. Stated differently, the goal of Java is to write software once to be run on any Java compliant platform. These different platforms include both different hardware platforms, e.g., RISC, PC, Macintosh, Sparc and different operating system platforms, e.g., Windows 95/NT, Unix, AIX, and Copeland. These platforms cover a large class of completely different machines from large servers to thin clients to small portable consumer devices such as personal digital assistants. Software programming tools are available from a variety of suppliers including Sun Microsystems (refer to online URL www.sun.com/java) for developing Java-based software applications, or more simply called Java Applications.

During the development of Java, the Internet, and more particular the World Wide Web ("Web") has become immensely popular largely because of the ease of finding information and the user-friendliness of today's browsers. A feature known as hypertext allows a user to access information from one Web page to another Web page by simply pointing (using a pointing device such as a mouse) at the hypertext and clicking. Another feature that makes the Web attractive is having the ability to process the information (or content) in remote Web pages without the requirement of having a specialized application program for each kind of content accessed. Thus, the same content is viewed across different platforms. Browser technology has evolved to enable running of applications that manipulate this content across a wide variety of different platforms.

In 1995, Sun Microsystems formally introduced HotJava. HotJava is a Web browser that can run Java code. Other Web browsers such as Netscape Navigator and Microsoft Internet Explorer have since added Java capability to their base Web browser products. The combination of Web browser technology combined with Java technology has increased the fundamental of appeal of Java, i.e., the ability to write an application once and run the application across a variety of platforms including Web browsers, and while most of the Java code is portable across platforms, including Java-compliant Web browsers, some functions such as returning handles to frames or the handling of Input/Output (I/O)are not compatible across platforms. Two categories of Java-based programs are necessary. The first category of Java base programs is called a Java Application that runs across computer platforms without being combined with a Web browser. The second category of Java-based programs is called Java Applets that run across systems using Java compliant Web browsers. The reason many functions are not compatible across Java runtime environments of Applets and Applications is due to security concerns. Java Applets are typically loaded by a Web browser being accessed. The Applet by design cannot write to or read from local storage devices. This deliberate limitation for I/O is designed to minimize the destructive use of Java Applets as computer viruses that unknowingly make changes to the compute system of the end user. A Java Applet with local write and read access could easily create havoc by deleting, renaming, scrambling and otherwise corrupting a user computer system.

Both of these categories of Java-based programs, Java Application and Java Applets require specialized I/O handling. Providers of Java Applications and Java Applets that perform database queries want to demonstrate an application without the need to be connected to a database. Accordingly, there is a need for a method to provide an I/O class interface that can be used both by Java Applications and Java Applets which provides a method to demonstrate Java-based code that performs database queries without being connected to a database.

Furthermore, providers of applications often want to demonstrate network connectivity using a Java Applet or Java Application communicating to a server, but not perform database calls on the server during the demonstration. The desire not to interface to a database during a demonstration may be based on a variety of reasons, such as, limiting the access to a database over the Internet for security concerns, minimizing the performance hits to a database running a live application while demonstrating the code, or simple the complexity of having a database up and running during the initial phases of a sales cycle. Accordingly, a need exists to provide a method to demonstrate Java-based applications that can demonstrate network connectivity using a browser with out the requirement of performing database queries when demonstrating database driven applications.

SUMMARY OF THE INVENTION

Briefly, in accordance with the present invention, a method to retrieve data in a information processing unit comprises: creating a pointer into a database based on a category of data to be retrieved, determining if an application running on the information processing unit is running in an online mode where the information processing unit is coupled to a database server or if the application is running in an offline mode where the information processing unit is not coupled to the database server; and retrieving at least part of the data using the pointer to the database when the application is running in an online mode. In accordance with another aspect of the invention, a computer readable medium can include instructions to program data processing apparatus to carry out the above method.

DETAILED DESCRIPTION OF AN EMBODIMENT

Figure 1:
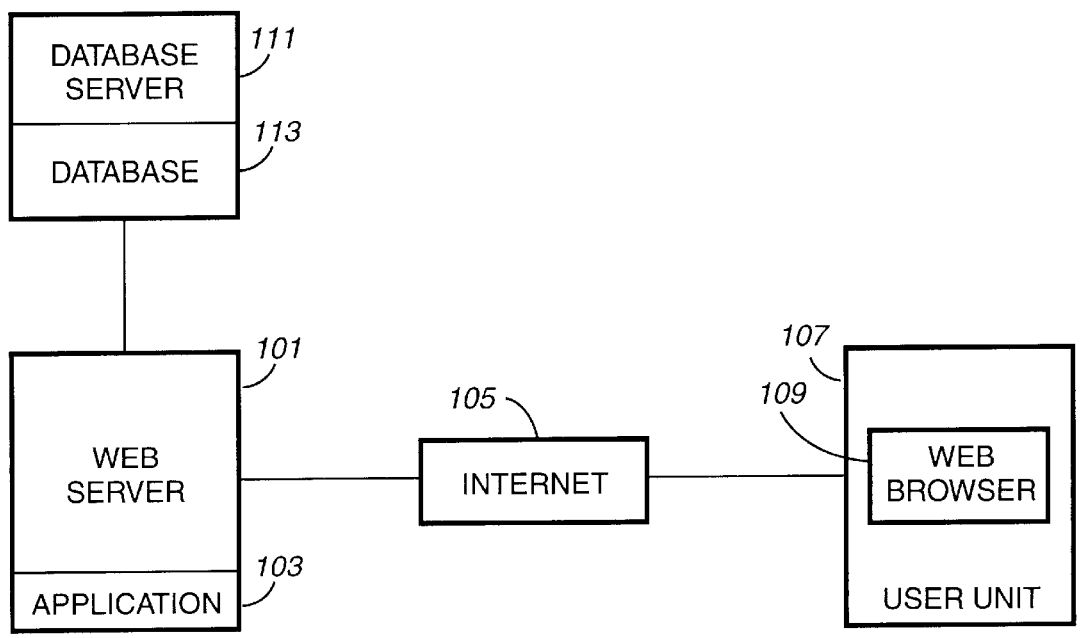
FIG. 1 is a functional block diagram of a typical information processing system for hosting Web pages in which the present invention is implemented.

FIG. 1 is a functional block diagram depicting a typical information processing system for hosting Web pages 100. A Web server 101 running a Web server and application 103. The Web server 101 is connected to the Internet 105. An End-user information processing unit 107 with a Web browser 109 are connected to the Internet 105. Networks other than the Internet 105 can be also used within the true spirit of the present invention including Intranets, extranets and other public or private networks. Web server 101 is an IBM PC Server, Sun Sparc Server, HP RISC server or equivalent. The Web browser 109 is any HTTP (Hyper-Text-Transfer-Protocol) compatible product such as Netscape Navigator, Sun HotJava Browser, Microsoft Internet Explorer or equivalent.

The application 103 is a Web page server application for hosting Web pages on the Web browser 109. The application 103 is written in any software language that can transmit Sun Microsystems Java-based applications to Web browser 109. Web server 101 is coupled to a database server 111 running database 113. The database server 111 physically can be the same server running on the Web server 101 or a standalone system. Typical database servers 111 include Oracle SQL, IBM DB/2 and Microsoft SQL. It is important to point out that the precise operating systems and hardware configurations of the Web server 101, the end-user unit 107, and the Web browser 109 are not limited to any specific hardware or software configuration. These systems can be implemented on a wide variety of hardware and software platforms.

Figure 2:
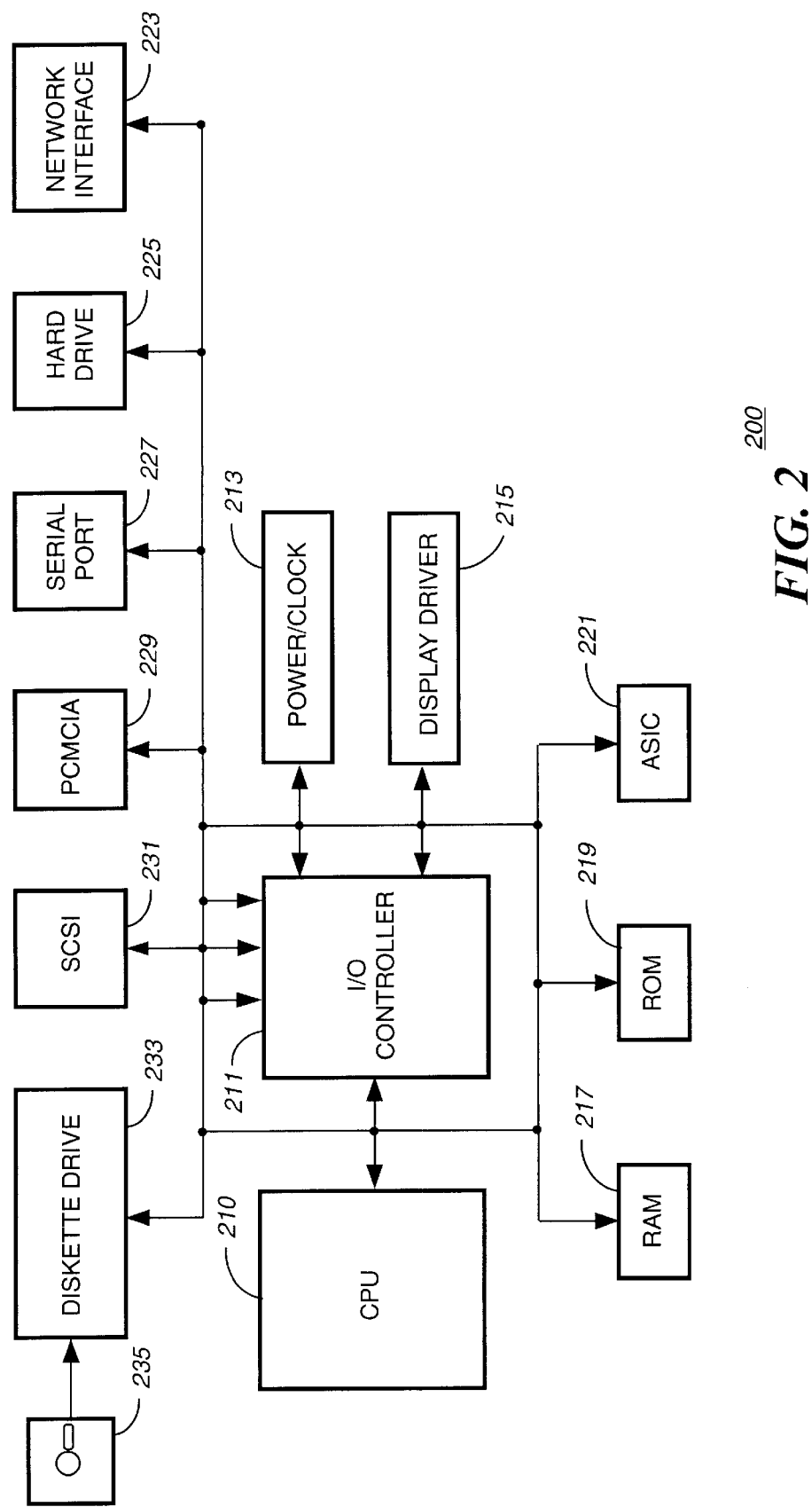
FIG. 2 is a functional block diagram of the major electrical components of a information processing system used in accordance with this invention.

Referring to FIG. 2, there is shown a block diagram of the major electrical components of a information processing system 200 used in accordance with this invention. Information processing system 200 is representative hardware of end-user unit 107 hosting Web browser 109 for Java Applets. In the Java Application mode, information processing system 200 can be a standalone system. The electrical components of information processing system 200 include: a central processing unit (CPU) 210; an input/Output (I/O) Controller 211; a system power and clock source 213; a display driver 215; RAM 217; ROM 219; ASIC (application specific integrated circuit) 221; and a hard disk drive 225. These are representative components of a computer. The operation of a computer comprising these elements is well understood. Network interface 223 provides connection to a computer network such as Ethernet, TCP/IP, or other popular protocol network interfaces. Optional components for interfacing to external peripherals include: a Small Computer Systems Interface (SCSI) port 231 for attaching peripherals; a PCMCIA slot 229; and serial port 227. An optional diskette drive 233 is shown for loading or saving code to removable diskettes 235. The system 200 may be implemented by combination of hardware and software. Moreover, the functionality required for using the invention may be embodied in computer-readable media (such as 3.5 inch diskette 235) to be used in programming an information-processing apparatus (e.g., a personal computer) to perform in accordance with the invention.

Figure 3:
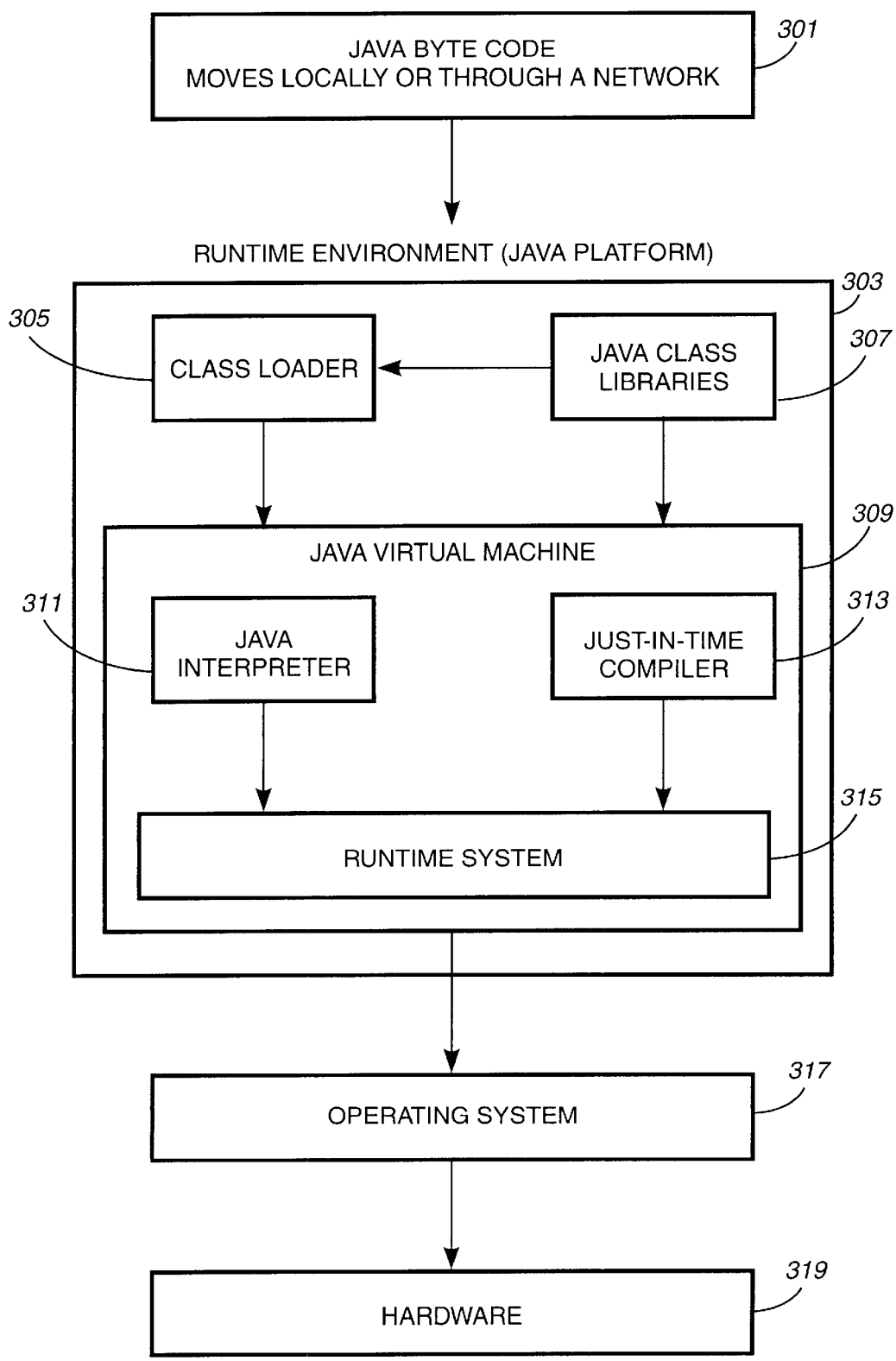
FIG. 3 is a block diagram of a Java Runtime environment according to the present invention.

Referring now to FIG. 3 is a block diagram of Java Runtime environment 300 according to the present invention. The Java language was created by Sun Microsystems. More information on Java Software and Java Developers tools is available online URL www.sun.com/java. The use of Java and the creation of Java Applications and Java Applets is well known. Once a software developer writes a Java source code, the code, rather than being compiled into a format designed for a specific platform, Java developers compile Java source into an intermediate form of byte code that can be executed on any system with a runtime environment. Java byte code 301 moves from a local hard disk over a network to a Java runtime environment 303. The Java byte code 301 is an intermediate form of byte code, that unlike platform specific byte code, can be executed on any platform with a Java runtime environment. The Java runtime environment 303 is the platform that enables Java Applications or in the case of Web browsers Java Applets, to run on any system regardless of the operating system and the underlying hardware. When the Java byte code 301 arrives in the runtime environment for a particular computer platform, a class loader 305 retrieves one or more Java class libraries 307 for the given operations specified by the Java byte code 301. The Java byte code 301 and Java class libraries are dynamically loaded in the Java Virtual Machine (VM) 309. The Java VM 309 is the heart of the Java platform. It is the Java VM that is customized to work with a particular operating system 317 such as Unix or Windows NT and with a particular hardware platform 319 such as HP RISC or Intel Pentium class machines. A Just-In-Time compiler 313 for dynamic compiling Java Interpreter 311 and runtime system 315 are known components of the Java VM 309. The Java VM 309 permits portability across a wide variety of hardware 319, such as information processing system 200, and permits portability across a wide variety of operating systems 317.

The Java runtime system 315 interprets the Java byte code 301 and Java class libraries 307 to run the Java program. If the Java VM is coupled to a Web browser, the Java program is called a Java Applet. Alternately, if the Java VM is not coupled to a Web browser, the Java program is called a Java Application.

In the preferred embodiment each function described for the Java I/O toolkit is a member of the Java class libraries 307. Each function invoked through a call in the Java byte code 301 is dynamically loaded.

Figure 4:
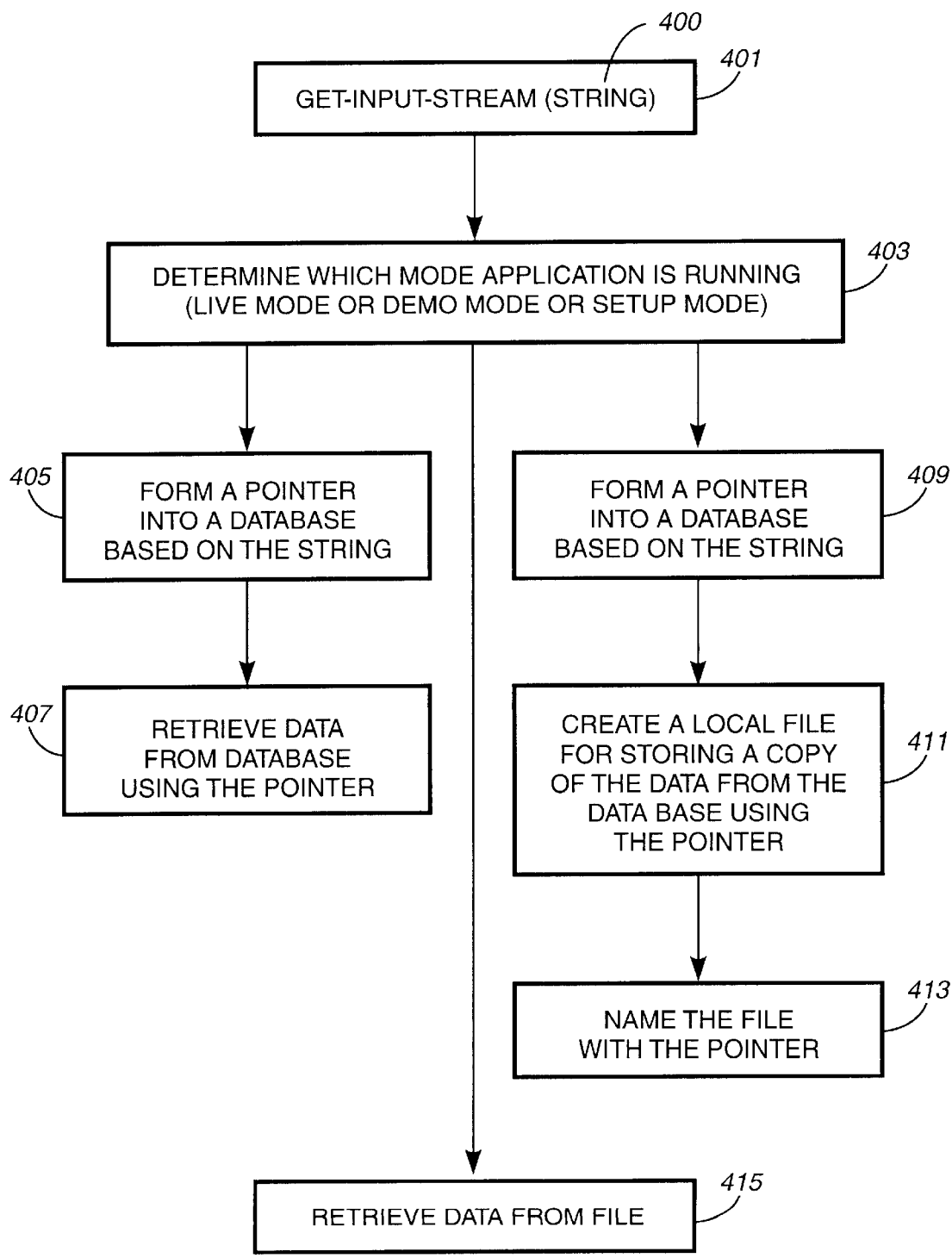
FIG. 4 is a flow diagram of a function for retrieving data according to the present invention.

Referring now to FIG. 4, shown is flow diagram of a function for a retrieving data according to the present invention. The function begins with get-input stream 401 having at least one parameter string 400. A determination of which one of three modes the application calling this function 401 is executing is tested, step 403. The three possible modes are (i) live mode; (ii) demo mode and (iii) set-up mode.

When the application is running in a "live" mode, that is a mode in which a database is available either locally or through a Internet 105, the string 400 is used to form a pointer 405 into the database 113 running on database server 111. A standard database query is made, such as a SQL or DB/2 query, and the data returned to the calling application, step 407.

When the calling application is running in setup mode, that is a mode in which a database is available either locally or through a Internet 105 or a network, Intranet or equivalent, the string 400 is used to form a pointer 409 into the database 113 and a standard database query is made. A file is created usually locally on the information processing system 200 such as on hard disk 225. In an alternate embodiment, if the application is a Java Applet, the copy can be stored on the Web server 101, step 411. A filename for the local copy of the data is created from the string 400, step 413. For example if the string is categoryid__1234__ automobile the filename would be composed of this name, this way when the data is retrieved without using the database, the name does not have to change in the calling application.

When the calling application is running is demo mode, that is a mode in which a database is not available either locally or over a network, the data is retrieved using the string 400 as the filename, step 415. It is important to note that if a the setup mode was not run for this particular data, a null string indicating an error is passed back to the calling application.

Figure 5:
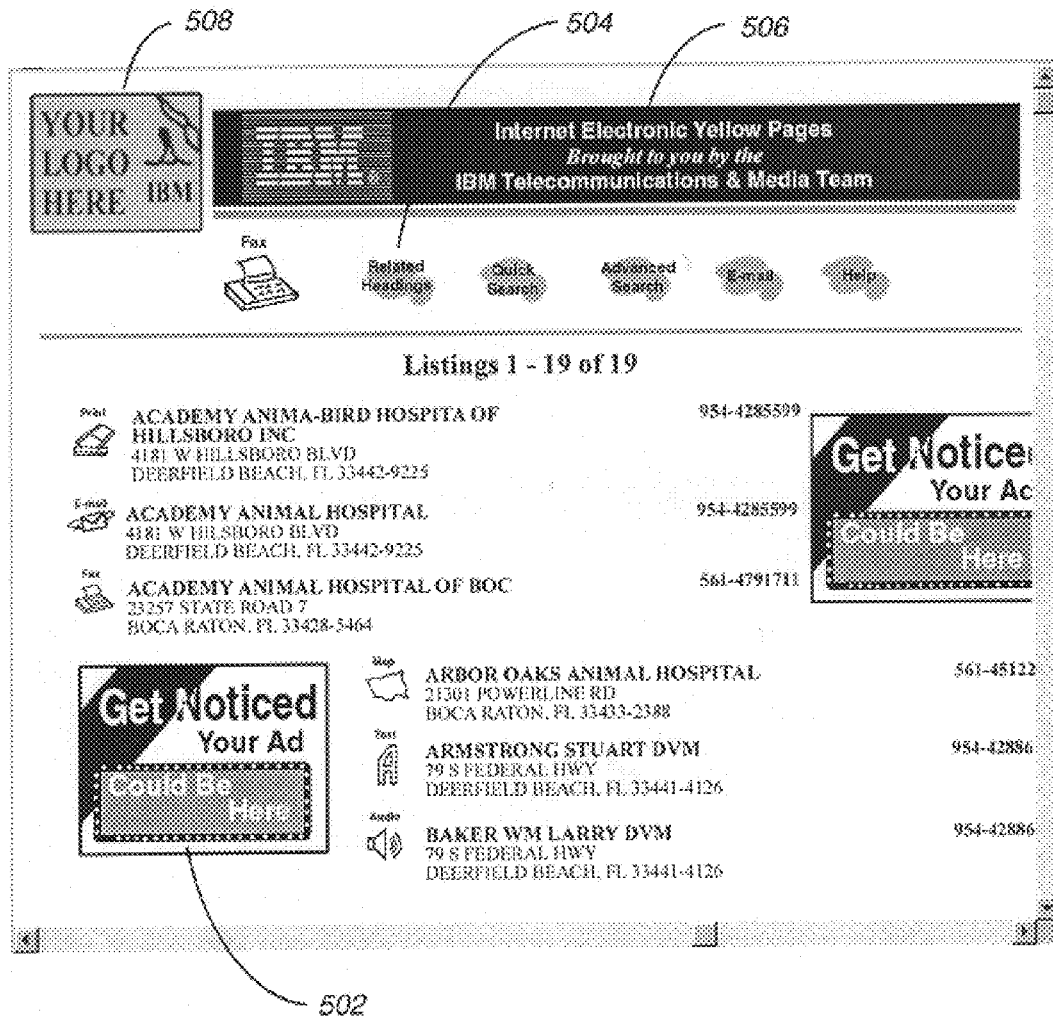
FIG. 5 is a screen capture for an electronic yellow pages application with different types of advertisement according to the present invention.

One embodiment for an online yellow pages application to display different types of images files will now be discussed. There string, which is ultimately used to create the pointer for the database query has a format of category__ location.number__category.id, for example a string as descibed in FIG. 4 categoryid__1234__automobile. Turning now to FIG. 5 is an example screen 500 for an electronic yellow pages application with different types of advertisement files according to the invention. One type of advertisement is a category advertisement 502, that may be used to advertise in a category in a directory listing. Example categories include the category used in paper Yellow Page listings such as automobiles or bookstores. So when a user enters the search for the category, such as automobiles, a advertisement for automobiles is displayed Another type of advertisement is listing services 504 that may be available, such as fax, related headings, and e-mail. This listing services may change depending on the type of listing, or category of listing. Another type of advertisement may be banners advertisement 506 where the advertisement is displayed in a banner like manner across the top or the bottom of the screen. Still, another type of advertisement is the service provider advertisement 508, promoting the provider who is suppling the online or electronic directory such as a regional bell company. Each of these advertisement may change depending on the listing being displayed. It should be understood that each of these advertisements can be stored in a file, with a filename organized in the database 113 retrieved during a database query.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method to retrieve data using a single input class operating in three or more modes, the input class being part of an interpretative based application running on an information processing unit, the method comprising the steps of:

executing an interpretative based application on an Interpretative Machine (IM) with an input class function containing at least one parameter string for passing data to the application;

determining which of a plurality of modes the application requesting input from the input class function is running, the plurality of modes including:
  a live mode, wherein the database is available either locally or through a network;
  a demonstration mode, wherein the database is not available; or
  a setup mode, wherein the database is available either locally or through a network;

wherein when the application is running in the live mode, the input class function performing the steps of:
  using the parameter string to create a pointer into the database; and
  retrieving the data from the database using the pointer to the database;

wherein when the application is running in the setup mode, the input class function performing the steps of:
  using the parameter string to create a pointer into the database;
  retrieving the data from the database using the pointer to the database; and
  creating a copy of the data retrieve from the database into a file on the information processing system with a file name based on the parameter string;

wherein when the application is running in the demo mode, the input class function performing the steps of:
  using the parameter string as the name of the file to retrieve data locally stored in a file on the information processing system during setup mode; and
  retrieving the data using the parameter string;

wherein when the application is running in an environment where the IM is coupled to a web browser or the application is running in an environment where the IM not coupled to a web browser, no changes to the application making the call to the input class is necessary to retrieve data.

2. The method according to claim 1, wherein the step of retrieving data in a live mode further comprises the sub-step of connecting to a server coupled to a database.

3. The method according to claim 2, wherein the sub-step of connecting to a database further comprises connecting to a web server running a servlet coupled to a database.

4. The method according to claim 1, wherein the step of retrieving data in a demo mode includes an application written in Java retrieving data from a servlet on a web server.

5. The method according to claim 1, wherein the step of using the parameter string in either the live mode or the setup mode to create a pointer to the database further comprises the sub-step of creating a pointer into the database based on a geographical location for the data to be retrieved.

6. The method according to claim 1, wherein the step of using the parameter string in either the live mode or the setup mode to create a pointer to the database further comprises the sub-step of creating a pointer into the database based on a sub-category for the data to be retrieved.

7. A computer readable medium containing programming instructions for retrieving data using a single input class operating in three or more modes, the input class being part of an interpretative based application running on an information processing unit, the method comprising the steps of:

executing an interpretative based application on an Interpretative Machine (IM) with an input class function containing at least one parameter string for passing data to the application;

determining which of a plurality of modes the application requesting input from the input class function is running, the plurality of modes including:
  a live mode, wherein the database is available either locally or through a network;
  a demonstration mode, wherein the database is not available; or
  a setup mode, wherein the database is available either locally or through a network;

wherein when the application is running in the live mode, the input class function performing the steps of:
  using the parameter string to create a pointer into the database; and
  retrieving the data from the database using the pointer to the database;

wherein when the application is running in the setup mode, the input class function performing the steps of:
  using the parameter string to create a pointer into the database;
  retrieving the data from the database using the pointer to the database; and
  creating a copy of the data retrieve from the database into a file on the information processing system with a file name based on the parameter string;

wherein when the application is running in the demo mode, the input class function performing the steps of:
  using the parameter string as the name of the file to retrieve data locally stored in a file on the information processing system during setup mode; and
  retrieving the data using the parameter string without performing any calls to the database without performing any calls to the database.

8. The computer readable medium of claim 7, wherein the instruction of retrieving data in a live mode further comprises the instruction of connecting to a server coupled to a database.

9. The computer readable medium 8, wherein the instruction of connecting to a database further comprises connecting to a web server running a servlet coupled to a database.

10. The computer readable medium of claim 7, wherein the instruction of retrieving data in a demo mode includes an application written in Java retrieving data from a servlet on a web server.

11. The computer readable medium of claim 7, wherein the instruction of using the parameter string in either the live mode or the setup mode to create a pointer to the database further comprising the instruction of creating a pointer into the database based on a geographical location for the data to be retrieved.

12. The computer readable medium of claim 7, wherein the instruction of using the parameter string in either the live mode or the setup mode to create a pointer to the database further comprising the instruction of creating a pointer into the database based on a sub-category for the data to be retrieved.

13. An information processing system for retrieving data using a single input class operating in three or more modes, the input class being part of an interpretative based application running on the information processing unit, the information processing unit comprising:

an interpretative based application executing on an Interpretative Machine (IM) with an input class function containing at least one parameter string for passing data to the application;

means for determining which of a plurality of modes the application requesting input from the input class function is running, the plurality of modes including:

a live mode, wherein the database is available either locally or through a network;

a demonstration mode, wherein the database is not available; or a setup mode, wherein the database is available either locally or through a network;

wherein when the application is running in the live mode, the input class function forms a pointer from the parameter string into the database for retrieving the data from the database;

wherein when the application is running in the setup mode, the input class function forms:

a pointer from the parameter string into the database for retrieving the data from the database;

a file containing a copy of the data retrieve from the database into a file, the file stored on the information processing system with a file name based on the parameter string;

wherein when the application is running in the demo mode, the input class function uses the parameter string as the name of the file to retrieve data locally stored in a file on the information processing system during setup mode without performing any calls to the database.

14. The information processing system according to claim 13, wherein the means for retrieving data in a live mode further comprises a connection to a server coupled to a database.

15. The information processing system according to claim 14, wherein the connection to server is a web server running a servlet coupled to a database.

16. The information processing system according to claim 13, wherein the means for retrieving data in a demo mode is an application written in Java retrieving data from a servlet on a web server.

17. The information processing system according to claim 13, wherein the pointer to a database using the parameter string in either the live mode or the setup mode further comprising a pointer into the database based on a geographical location for the data to be retrieved.

18. The information processing system according to claim 13, wherein the pointer to a database using the parameter string in either the live mode or the setup mode further comprising a pointer into the database based on a sub-category for the data to be retrieved.

* * * * *